United States Patent [19]
Gurries

[11] 4,084,618
[45] * Apr. 18, 1978

[54] SPOOL VALVE

[75] Inventor: Raymond A. Gurries, San Jose, Calif.

[73] Assignee: CMI Corporation, Oklahoma City, Okla.

[*] Notice: The portion of the term of this patent subsequent to Apr. 18, 1994, has been disclaimed.

[21] Appl. No.: 628,355

[22] Filed: Nov. 3, 1975

Related U.S. Application Data

[63] Continuation of Ser. No. 249,915, May 3, 1972, abandoned.

[51] Int. Cl.² ............................................. F15B 13/04
[52] U.S. Cl. ........................... 137/625.48; 137/625.69; 251/324
[58] Field of Search ...................... 137/625.66, 625.69, 137/625.48; 251/324

[56] References Cited

U.S. PATENT DOCUMENTS

| 2,920,650 | 1/1960 | Moog | 137/625.69 |
| 2,985,566 | 5/1961 | Tsien et al. | 251/324 X |
| 2,987,050 | 6/1961 | Oppenheimer et al. | 137/625.69 X |
| 3,024,808 | 3/1962 | Woodruff | 137/625.69 |
| 3,163,175 | 12/1964 | Pearson | 137/625.69 X |
| 3,588,032 | 6/1971 | Girola | 137/625.69 X |

FOREIGN PATENT DOCUMENTS

| 187,364 | 10/1956 | Austria | 251/324 |

Primary Examiner—Alan Cohan
Assistant Examiner—Gerald A. Michalsky
Attorney, Agent, or Firm—Paul B. Fihe

[57] ABSTRACT

A control valve for hydraulic systems including a sleeve and a spool supported for slidable motion therein, the sleeve and spool having control lands supported in slightly spaced relation to avoid chipping or abrasive contact and resultant imprecision in valve accuracy.

8 Claims, 2 Drawing Figures

1

SPOOL VALVE

This is a continuation of application Ser. No. 249,915 filed on May 3, 1972, now abandoned.

FIELD OF THE INVENTION

The present invention relates generally to valves, and more particularly, to a control valve primarily designed for use in a hydraulic system for controlling the operation, for example, of a hydraulic ram.

BACKGROUND OF THE INVENTION

In many instances, heavy industrial equipment utilizes one or more hydraulic rams to enable powered adjustment of the working implement or other element of the equipment under operator or automatic control. Specifically, for a number of years, road graders have utilized hydraulic rams to mount the grader blade or moldboard for height or cross-slope adjustment to meet the particular grading conditions. Quite recently, as described in detail in U.S. Pat. No. 3,346,976, issued to John Curlett and Raymond A. Gurries, road graders have incorporated automatic control mechanisms for such blade height and or cross-slope adjustments. More particularly, a fork is arranged to engage an external grade wire and actuate a hydraulic control valve for the hydraulic rams which effect raising or lowering of the blade to maintain it at desired grade level. In turn, to provide for automatic adjustment of cross slope of the blade, a pendulum unit is mounted on the road grader to actuate another hydraulic control valve for hydraulic rams that effectuate this purpose. Since the blade must be maintained at the desired level and cross-slope with a high degree of precision, the hydraulic control valves and other elements of the system must in turn be precise units capable of maintaining the desired level and cross-slope tolerances over extended periods of time. Severe problems, particularly in the case of the hydraulic control or servo valves have been encountered. Since certain mechanical tolerances in the valves must be in the neighborhood of 0.00001 inch to maintain the desired precision of hydraulic control, it will be obvious that but a slight amount of wear will create serious performance discrepancies. Thus, even though the hydraulic systems incorporate excellent filters, some minute particles (less than 3 microns) still remain and are sufficient to cause minute yet operationally significant abrasion of the relatively movable valve control surfaces. In addition, because of the pressures (e.g. 1,800 p.s.i) utilized in these hyraulic systems, any pressure imbalance in the valve may and does cause a minute but again significant scoring or chipping contact of critical control surfaces of the relatively movable parts of the valve. As a result, even though the valves are made with precision, their useful life under continued operation may be no more than 2 weeks. Not only is the valve replacement itself an expensive undertaking, but it also results in "down time" of the equipment to an extent which is of considerable economic impact.

SUMMARY OF THE PRESENT INVENTION

Accordingly, it is the general objective of the present invention to provide a control valve having very close mechanical tolerances to provide high precision control of a hydraulic system and which, moreover, is designed so that the control surfaces of the valve itself are substantially free from abrasion or chipping so that such precision control can be maintained over an extended period of time. To achieve this objective, the control valve preferably takes the form of a spool valve having an annularly grooved sleeve with a cylindrical bore therewithin that is intersected by two or more inlet and outlet passages connected through an exterior supporting body member to the other components of the entire hydraulic system. A valve member in the form of a spool having a number of exterior circumferential grooves separated by intervening control lands is slidably mounted in the sleeve bore for movement between a closed position whereat the inlet and outlet passages are blocked from fluid communication and open positions when the spool is shifted axially in the bore from such closed position, the amount of fluid communication between the inlet and outlet passages preferably being proportional to the amount of axial sliding motion of the spool. Precision in the opening and closing functions is achieved by providing precisely machined (lapped) corners or edges where the control lands meet the adjacent grooves on the exterior of the spool together with similar close tolerances in the machining of the adjacent corners or edges of the interior grooves joining the inlet and outlet passages in the encompassing sleeve of the valve. These spool and sleeve control surfaces are also designed so that regardless of the position of the spool within the bore of the body member, a pressure balance is maintained so that but slight mechanical effort is required to shift the spool.

Specifically, in accordance with the objective of the invention, the precision control surfaces generally described hereinabove are arranged so that abrasion or chipping is avoided and control accuracy is thus maintained over an extended period of time. First, the control lands on the spool are positioned so as to maintain controlled clearance from the sleeve bore and such clearance is achieved by providing bearing lands on the spool which provide for sliding contact with the interior of the sleeve bore at positions axially spaced from the control lands. For this purpose, these bearing lands are slightly enlarged in diameter from the diameter of the control lands or, as one obvious alternative, the interior diameter of the sleeve bore can be made slightly less in the area of the bearing lands than that in the area of the control lands. More generally, slightly greater clearance (e.g. 0.0001) is maintained between the spool and sleeve at the control area than at the bearing area.

Since the hydraulic systems to which the present control valve is applicable frequently operate at a pressure approximating 1,800 p.s.i. the external hydraulic connections in the body member are located radially outward from the sleeve and spool, lateral pressure imbalances which might bend the spool sufficiently to provide direct damaging contact between the control surfaces of it and the sleeve must also be avoided, and in accordance with an additional aspect of the present invention, the inlet and outlet passages in the sleeve are formed by exterior grooves connected to the interior body by radial passages which are multiple in number and are located at equally-spaced circumferential positions. For example, the inlet passage may terminate in four interior openings spaced at 90° intervals so that regardless of the pressure of the hydraulic fluid, it is exerted equally at all circumferential positions on the spool thus to maintain the same in its true axially aligned disposition within the bore of the sleeve or body member. The interior grooves on the sleeve and the exterior grooves of the spool create annular chambers around the spool to maintain this balance.

BRIEF DESCRIPTION OF THE DRAWINGS

The stated objective of the invention and the manner in which it is achieved as summarized hereinabove will be more readily understood by reference to the following detailed description of an exemplary embodiment of the invention as shown in the accompanying drawing wherein.

DETAILED DESCRIPTION OF THE EXEMPLARY EMBODIMENT OF THE INVENTION

Figure 1:
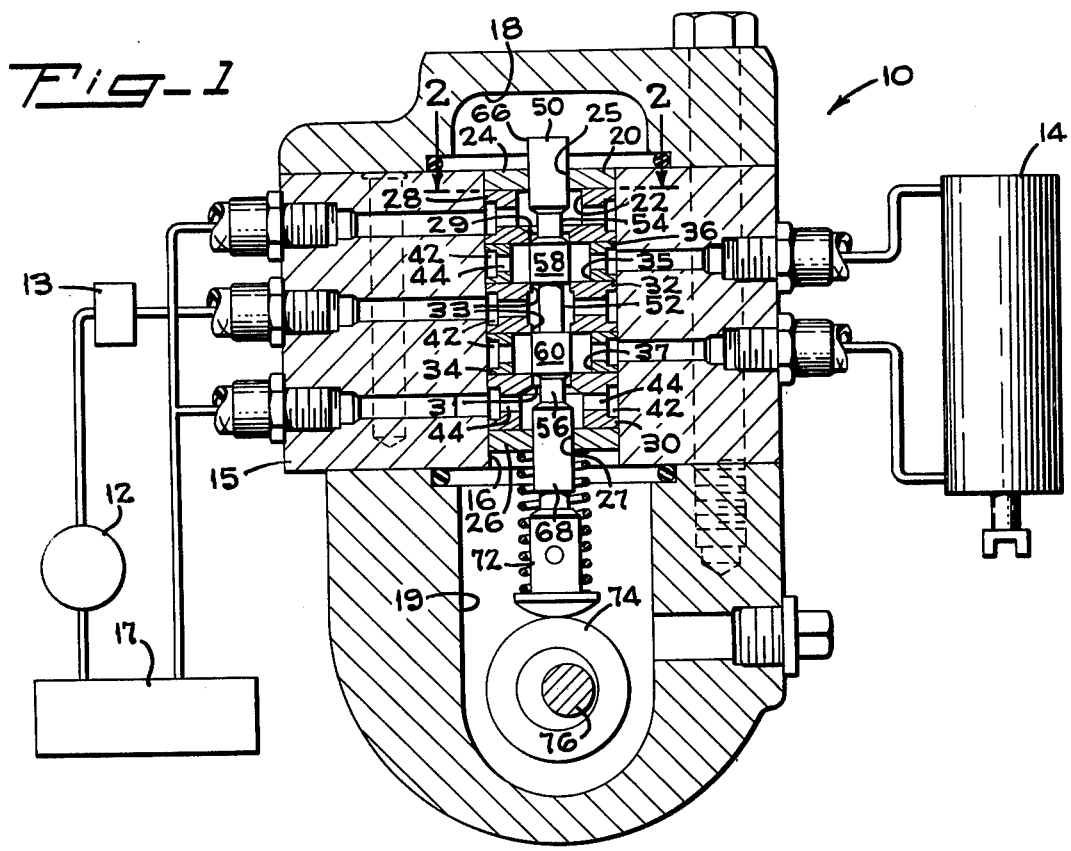
FIG. 1 is a fragmentary longitudinal sectional view of a spool valve embodying the present invention and diagrammatically indicated in association with an exterior hydraulic system.

The control valve, generally indicated at 10 in FIG. 1, constitutes a four-way spool valve that is incorporated in a hydraulic system arranged to selectively deliver hydraulic fluid from a pump 12 through a filter 13 to the opposite ends of a double-acting hydraulic ram 14 although it is to be specifically understood that the principle of the present invention can be incorporated in simpler control valves arranged to control communication between a single inlet passage and a single outlet passage or in yet more complex valve arrangements.

As specifically illustrated, the four-way spool valve 10 includes an exterior body member indicated at 15 having an axial cylindrical bore 16 extending therethrough and intersected at axially-spaced positions by passages enabling connection to the exterior hydraulic system including the pump 12 and filter 13, the opposite ends of the ram 14 and a hydraulic reservoir 17. Enlarged chambers 18, 19 at opposite ends of the bore 16 enable sealed mechanical connection to exterior actuating elements of a suitable nature to be mentioned hereinafter.

Figure 2:
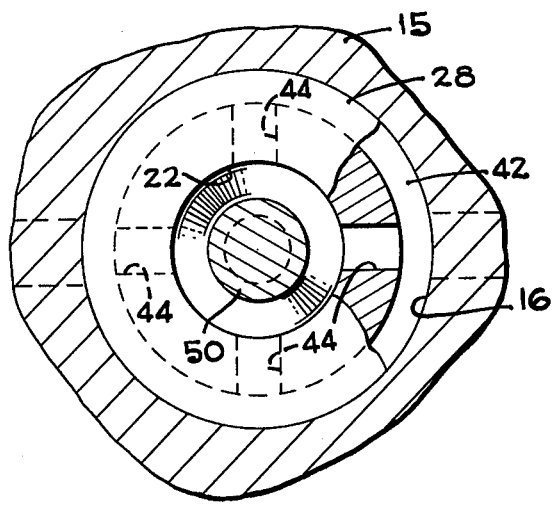
FIG. 2 is a transverse fragmentary sectional view taken along line 2—2 of FIG. 1.

A sleeve 20 is pressed within the bore 16 of the body member 15 in a predetermined axial disposition so that five like exterior grooves 42 are in fluid communication with the passageways connected to the exterior hydraulic elements. As best shown in FIG. 2, each exterior groove 42 is placed in communication with the interior bore 22 of the sleeve by four ports 44 which extend radially inward at circumferential intervals of 90° thus to enable a balanced flow of hydraulic fluid into or out of the sleeve bore 22. Although the sleeve 20 theoretically can be formed as an integral unit, it is preferred, as illustrated, to form the sleeve in a plurality of sections which subsequently can be joined by a brazing operation to form the completed unit. More particularly, the sleeve 20 includes upper and lower end rings 24, 26 whose interior surfaces form bearing lands 25, 27 for the valve spool 50 as will be described in detail hereinafter, and additional control lands 29, 31, 33 are formed in return passage rings 28, 30 which lie adjacent the end rings 24, 26 and also in axial extremities of a central inlet ring 32 which is supported in axially spaced relationship from the return passage rings 28, 30 by intermediate rings 34, 36 whose interior diameters are substantially larger to form interior grooves 35, 37 which in the present instance are connected through the radial ports 44 of the external connections to the mentioned opposite ends of the hydraulic ram 14. Preferably, all of the elements of the body member or sleeve 20 are formed from a hard alloy steel such as Nitralloy 315 and the interior control surfaces are nitrided so as to attain a Rockwell C hardness of approximately 65–70.

The mentioned valve spool 50 is of generally cylindrical configuration, dimensioned for close slidable reception within the sleeve 20 and is exteriorly machined to provide three circumferential grooves 52, 54, 56 that are separated axially by two intervening control lands 58, 60. The central groove 52 is equivalent in axial length to the central inlet ring 32 of the surrounding sleeve 20 and the control lands 58, 60 on either side thereof, in turn, correspond in axial length to that of the ram rings 34, 36 so that when the spool is in its neutral or closed position, as shown in FIG. 1, no communication between any of the passages exists. More particularly, the edge surfaces adjacent all of the control lands are precisely machined and lapped to close tolerances approximating 0.00005 inch so that no overlap or underlap of these control edges exist.

If the spool 50 is moved downwardly from the illustrated neutral or closed position, hydraulic fluid can flow through the inlet ring 32 from the exterior pump 12 and filter 13 and thence through the ram ring 34 thereunder to one end of the hydraulic ram 14 and, at the same time, the opposite end of the hydraulic ram 14 is placed in communication through the other ram ring 36, now in fluid communication with the upper return passage ring 28 and a return conduit to the mentioned reservoir 17 connected in series hydraulic circuit with the described pump 12. On the other hand, if the spool 50 is moved upwardly from its neutral position, the reverse action occurs, hydraulic fluid under pressure being delivered to the opposite end of the ram 14 whose other end is now placed in communication through the return passage ring 30 to the reservoir 17 and suction side of the pump 12. Regardless of the established paths of fluid flow into or out of the valve 10, the annular grooves and circumferentially-symmetric ports in each ring provide for pressure balance so that no bending or radial displacement of the central spool 50 occurs. Furthermore, the symmetric axial relation of the various rings enables an axial pressure balance to be maintained.

The two described control lands 58, 60 of the spool 50 are maintained in slight clearance relationship with regard to the adjacent control lands 29, 31, 33 of the surrounding sleeve 20 by slight diametral enlargement of bearing lands 66, 68 at the opposite extremities of the spool, or in other words, in axially spaced relationship to the central control lands 58, 60. Preferably, all of the spool lands 58, 60, 66, 68 are initially machined to equivalent, close tolerance diameters and, as a final step, the two bearing lands 66, 68 are plated with hard chromium to a diameter enlarged approximately 0.0001 inch. Accordingly, these bearing lands 66, 68 are in sliding contact with the interior bearing lands 25, 27 of the end rings 24, 26, thus to provide an additional 0.0001 clearance between the control lands 58, 60 on the spool and the adjacent control lands 29, 31, 33 in the surrounding sleeve 20. While this is but a slight clearance it has been found in practice to be sufficient to preclude chipping contact between the control lands of the sleeve 20 and spool 50.

While not specifically part of the invention, a spring-urged extension 72 of the lower extremity of the spool 50 is arranged for engagement by a cam 74 mounted on a shaft 76 controlled by an exterior element (not shown) such as the wire-engaging fork or pendulum as described in the previously mentioned U.S. Pat. No. 3,346,976. It has been found in this form of installation that a total spool length of 2.788 inches allows with correlated dimensions of the various control elements a full stroke of the valve spool 50 of 0.281 inches and with such stroke, a flow of hydraulic fluid which is proportional to the movement of the spool results and with an input hydraulic pressure of 1,800 p.s.i. allows a flow of ten gallons per minute when the valve 10 is in its full open position. In turn, as imparted motion to the hydraulic ram 14 brings the controlled element (e.g. the grader blade) into the desired position, a proportional reduction of the flow of the hydraulic fluid minimizes any hunting.

With such valve dimensions and flow characteristics, an exemplary design of the interior diameter of the sleeve 20 is 0.3130 inch, the spool bearing lands 66, 68 have a diameter of 0.3129 inch, and the control lands 58, 60 accordingly have a diameter of 0.3128 inches. Thus, a total clearance between the control lands of 0.0002 inch is attained and if the filter 13 removes all particles greater than 3 microns (0.00012 inch), it will be obvious that smaller particles can pass through the valve without abrasive contact with the critical control surfaces. As a practical matter, a four-way valve, as specifically described herein, has with the incorporated inventive features attained a useful life a hundredfold in excess of that of valves omitting such features and moreover, has maintained its precision of control throughout the entire period.

As previously indicated, a number of modifications in the precise nature of the valve can be incorporated without departing from the spirit of the invention, and the foregoing description of one embodiment is accordingly to be considered as purely exemplary and not in a limiting sense. The actual scope of the invention is to be indicated only by reference to the appended claims.

What is claimed is:

1. A control valve which comprises
a sleeve having a longitudinal bore defined by axially-spaced control and bearing lands and inlet and outlet passages connected to said bore at axially-spaced positions,
a spool member having circumferential grooves separated by control lands and arranged for slidable motion in said sleeve bore to control communication between said inlet and outlet passages,
said spool member also having bearing lands at positions axially separated from said control lands and arranged to slidably support said spool member on adjacent bearing lands in said bore, the diametral clearance between said spool bearing lands and said sleeve bearing lands being slightly less than that between said spool control lands and the adjacent control lands of said sleeve thereby to eliminate contact between said control lands, said clearance difference being so slight as to substantially preclude fluid flow between adjacent surfaces of said control lands of said sleeve and spool.

2. A control valve according to claim 1 wherein
each of said inlet and outlet passages terminates in a circumferential groove connected by a plurality of equally-spaced radial ports with said bore.

3. A control valve according to claim 1 wherein
the bearing lands on said spool member have diameters, each approximately 0.0001 inch more than that of each of said control lands.

4. A control valve according to claim 3 wherein
said spool bearing lands are located at opposite axial extremities of said spool member and said control lands are at intermediate positions whereby a symmetrical arrangement of said lands about a central axial spool position is provided.

5. A control valve according to claim 3 wherein
said control lands of said spool and sleeve have a clearance of approximately 0.0002 inch.

6. A control valve according to claim 3 wherein
the increased diameter of said bearing lands on said spool member are formed by plated hard material.

7. A control valve which comprises
a sleeve having a longitudinal bore defined by axially-spaced control and bearing lands and inlet and at least two outlet passages connected to said bore at axially-spaced positions,
a spool member having circumferential grooves separated by control lands of equal diameter and equivalent in axial length to the spacing between the control lands of said sleeve, and arranged for slidable motion in said sleeve bore in both directions to control communication between said inlet passage and either of said outlet passages,
said spool member also having bearing lands at positions axially separated from said control lands and arranged to slidably support said spool member on adjacent bearing lands in said bore, the diametral clearance between said spool bearing lands and said sleeve bearing lands being slightly less than that between said spool control lands and the adjacent control lands of said sleeve, thereby to eliminate contact between said control lands, said clearance difference being so slight as to substantially preclude fluid flow between adjacent surfaces of said control lands of said sleeve and spool.

8. A control valve according to claim 7 which comprises
means for moving said spool member in either direction from a neutral position whereat a central groove of said spool member precisely registers with a central control land of said sleeve.

* * * * *